United States Patent
Bronkhorst et al.

(10) Patent No.: US 9,823,903 B2
(45) Date of Patent: Nov. 21, 2017

(54) DEBUGGING SOFTWARE THROUGH VISUAL REPRESENTATIONS MAPPED TO COMPUTER CODE

(75) Inventors: Campegius Bronkhorst, Tucson, AZ (US); Clifton Malcolm Nock, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1026 days.

(21) Appl. No.: 12/175,659

(22) Filed: Jul. 18, 2008

(65) Prior Publication Data
US 2010/0017788 A1    Jan. 21, 2010

(51) Int. Cl.
| G06F 9/45 | (2006.01) |
| G06F 9/44 | (2006.01) |
| G06F 11/36 | (2006.01) |

(52) U.S. Cl.
CPC ............ *G06F 8/34* (2013.01); *G06F 11/3664* (2013.01)

(58) Field of Classification Search
CPC ..................................................... G06F 11/323
See application file for complete search history.

(56) References Cited

U.S. PATENT DOCUMENTS

| 5,678,003 | A | * | 10/1997 | Brooks | G06F 11/3664 710/200 |
| 6,003,143 | A | * | 12/1999 | Kim | G06F 11/323 706/46 |
| 6,275,956 | B1 |  | 8/2001 | On et al. | |
| 7,174,536 | B1 | * | 2/2007 | Kothari | G06F 11/3664 717/105 |
| 7,464,373 | B1 | * | 12/2008 | Yunt | G06F 8/10 717/125 |
| 2003/0236986 | A1 | * | 12/2003 | Cronce | G06F 21/14 713/189 |
| 2005/0240863 | A1 | * | 10/2005 | Olander | G06F 8/20 715/229 |
| 2006/0129993 | A1 | * | 6/2006 | Belisario | G06F 11/362 717/124 |
| 2006/0190929 | A1 | * | 8/2006 | Bennett | G06F 11/3664 717/124 |
| 2007/0283330 | A1 | * | 12/2007 | Bates | 717/129 |
| 2014/0250422 | A1 | * | 9/2014 | Bank | G06F 9/4443 717/109 |

* cited by examiner

*Primary Examiner* — Li B Zhen
*Assistant Examiner* — Lenin Paulino
(74) *Attorney, Agent, or Firm* — Kilpatrick Townsend & Stockton LLP

(57) ABSTRACT

Debugging tools to allow a developer to debug software at a higher level of abstraction than the source code. These tools may be configured to recognize certain source code, and map it to visual representations that can be shown to the developer. The tools may allow the developer to set breakpoints in those visual representations, and they may allow the debugger to stop at those breakpoints, show the developer the visual representation and indicate the stopped location of the program being debugged, for example, by highlighting a particular component of the visual representation. The tools may also map breakpoints in visual representations to actual source code breakpoints.

25 Claims, 9 Drawing Sheets

DEBUGGING SOFTWARE THROUGH VISUAL REPRESENTATIONS MAPPED TO COMPUTER CODE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to software development, and more particularly, to tools for debugging software.

BACKGROUND

Software programs typically are debugged using a debugger. This debugger will run the program, called the "debuggee," under its control. The problem debuggers solve is that developers want to be able to stop the debuggee at times, and examine the state of the debuggee. To do that, debuggers generally allow the developer to set breakpoints in source code, and the debugger will stop at those breakpoints, showing the developer the source code, stack, thread, and data views, and allowing the developer to inspect variables.

In many cases, however, source code, stack, thread and data views are not always an optimal or complete representation of the state of the debuggee when stopped at the breakpoint. At times diagrams, schematics, flow charts, tables, or any other visual representation are better suited to show the state of the debuggee. This is especially true in declarative programming, in which the software application may best be depicted using high-level visualizations, such as those mentioned above. Moreover, in some cases, the source code for a software application may be obscured or otherwise unavailable to a developer, rendering source code-level debuggers ineffective at assisting developers in such cases.

BRIEF SUMMARY

In an aspect, certain embodiments provide debugging tools to allow a developer to debug software at various levels of abstraction, including, in some cases, at a source code level, but also at higher levels of abstraction than source code. In some cases, these various levels of abstraction all may be accessible to the user at the same time during the debugging process. In some embodiments, the debugger is configured to recognize certain computer code (and/or states of execution of that code), and map it to visual representations that can be shown to the developer. Advantageously, this functionality allows the developer to set breakpoints in those visual representations, and it allows the debugger to stop at those breakpoints, show the developer the visual representation and indicate the stopped location of the debuggee, for example, by highlighting a particular component of the visual representation. Tools provided by certain embodiments can map breakpoints in visual representations to actual source code breakpoints.

Some embodiments allow the developer to execute "step over" and/or "step into" commands that are interpreted as stepping from one component of a visual representation to another component of the same (or another) visual representation. Other embodiments allow the developer to inspect components of the visual representation. Merely by way of example, tools in accordance with certain embodiments map inspections of pieces of visual representations to inspections of variables in the source code.

Similarly, tools in accordance with other embodiments map stepping commands in visual representations to stepping and/or running commands in the source code. Merely by way of example, a debugger might executes a step command in a visual representation by setting a temporary breakpoint in the source code and running to that breakpoint. In some embodiments, tools allow the developer to switch between the visual representation of the stopped debuggee's state, and a source code based view of the debuggee's state. Stack, thread and data windows may be displayed for the user in either mode of debugging.

The tools provided by various embodiments include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, one set of embodiments provides methods. An exemplary method might include providing a user interface to allow a user to interact with a software debugging environment. The method might also comprise accessing a set of computer code associated with a software program. In some cases, the method further comprises causing a display of a graphical depiction of the software program (for example, by transmitting data from a server computer to a client computer to cause the client computer to display the graphical depiction, and/or by causing a computer's operating system to display the graphical depiction on a display device); this graphical depiction may be displayed for the user and/or via the user interface.

The method might further comprise providing, via the user interface, a mechanism for the user to control execution of the computer code by interacting with the graphical depiction of the software program. In particular embodiments, the method further comprises executing at least some of the computer code and/or causing a display, via the user interface and by reference to the graphical depiction of the software program, of progress of execution of the computer code.

Another exemplary method, in accordance with certain embodiments, provides for interaction between a user and a software debugging environment. The method might comprise providing a user interface to allow a user to interact with a development environment, and/or receiving, from the user, first user input for creating a graphical depiction of a process. The method might further comprise creating, at a computer and based on the first user input, the graphical depiction of the process and/or accessing a set of computer code that controls the process. In some embodiments, the method comprises displaying for the user, via the user interface, the graphical depiction of the process controlled by the set of computer code, and/or providing, via the user interface, a mechanism for the user to control execution of the computer code by interacting with the graphical depiction of the process;

In an aspect of some embodiments, the method further includes receiving, via the user interface, second user input indicating that the user desires to interrupt execution of the computer code at a desired point in the process; the second user input might interaction between the user and the graphical depiction of the process. An indication may be displayed, on the graphical depiction of the process (e.g., via the user interface), that execution of the computer code will be interrupted at the desired point. Further, the second user input received via the user interface might be mapped to a particular location in the computer code.

Accordingly, the method might comprise executing at least some of the computer code, and/or displaying, via the user interface and by reference to the graphical depiction of the process, progress of execution of the computer code. Execution of the computer code might be interrupted at the desired point in the process, and/or the method might include displaying, via the user interface, an indication that execution of the computer code has been interrupted.

Certain embodiments can be used for debugging declarative programs, of which a page flow is but one example. Hence, a set of embodiments includes methods for providing interaction between a user and a software debugging environment (in which a declarative program may be executed and/or debugged). An exemplary method comprises providing a user interface to allow a user to interact with a development environment and/or receiving, from the user, first user input for creating a graphical depiction of a page flow through one or more web pages. In an aspect, the page flow might comprise one or more events in a lifecycle of each of the one or more web pages.

The method, then, might further comprise creating, at a computer and/or based on the first user input, the graphical depiction of the page flow, and/or accessing a set of computer code that controls the page flow. The method, in some embodiments, also includes displaying for the user, via the user interface, the graphical depiction of the page flow controlled by the set of computer code, and/or providing, via the user interface, a mechanism for the user to control execution of the computer code by interacting with the graphical depiction of the page flow. Accordingly, the method might also include receiving, via the user interface, second user input indicating that the user desires to interrupt execution of the computer code at a desired point in the page flow; in an aspect, the user input might comprise interaction between the user and the graphical depiction of the page flow.

The method, in some cases, further includes displaying, via the user interface, an indication on the graphical depiction of the page flow that execution of the computer code will be interrupted at the desired point. This second user input received via the user interface may be mapped to a particular location in the computer code, and/or at least some of the computer code may be executed. The method, therefore, can include displaying, via the user interface and by reference to the graphical depiction of the page flow, progress of execution of the computer code, and/or interrupting execution of the computer code at the desired point in the page flow. The method might also include displaying, via the user interface and by reference to a graphical depiction of a web page in the page flow, an indication that execution of the computer code has been interrupted, and/or displaying, via the user interface and by reference to a graphical depiction of the web page in the page flow, a state of one or more variables associated with the web page. Perhaps in response to input from the user, the method can also include displaying computer code corresponding to at least a portion of the page flow, wherein displaying the computer code comprises displaying an indication, at the particular location in the computer code, that execution of the computer code has been interrupted.

Another set of embodiments, as noted above, provides systems. An exemplary computer system in accordance with one set of embodiments, includes a processor and a computer readable storage medium. The computer readable storage medium might have encoded thereon a set of instructions executable by the computer system to perform one or more operations. The set of instructions might include instructions for performing procedures in accordance with one or more methods provided by various embodiments.

Merely by way of example, the set of instructions might include instructions for providing a user interface to allow a user to interact with a development environment, and/or instructions for receiving, from the user, first user input for creating a graphical depiction of a process. The set of instructions might also include instructions for creating, based on the first user input, the graphical depiction of the process, instructions for accessing a set of computer code that controls the process, and/or instructions for causing a display, via the user interface, of the graphical depiction of the process controlled by the set of computer code.

There might also be further instructions for providing, via the user interface, a mechanism for the user to control execution of the computer code by interacting with the graphical depiction of the process, and/or instructions for receiving, via the user interface, second user input indicating that the user desires to interrupt execution of the computer code at a desired point in the process; the second user input might comprise interaction between the user and the graphical depiction of the process. Accordingly, the set of instructions might also include instructions for causing a display, via the user interface, of an indication on the graphical depiction of the process that execution of the computer code will be interrupted at the desired point, and/or instructions for mapping the second user input received via the user interface to a particular location in the computer code.

The set of instructions might further comprise instructions for executing at least some of the computer code, and/or instructions for causing a display, via the user interface and by reference to the graphical depiction of the process, of progress of execution of the computer code. In addition, there might also be instructions for interrupting execution of the computer code at the desired point in the process, and/or instructions for causing a display, via the user interface, of an indication that execution of the computer code has been interrupted.

A further set of embodiments provides devices and apparatus. An exemplary apparatus comprises a computer readable storage medium having encoded thereon a set of instructions executable by a computer system to perform one or more operations, including without limitation operations in accordance with one or more methods provided by various embodiments. Merely by way of example, the set of instructions might comprise one or more of the instructions described above.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1:
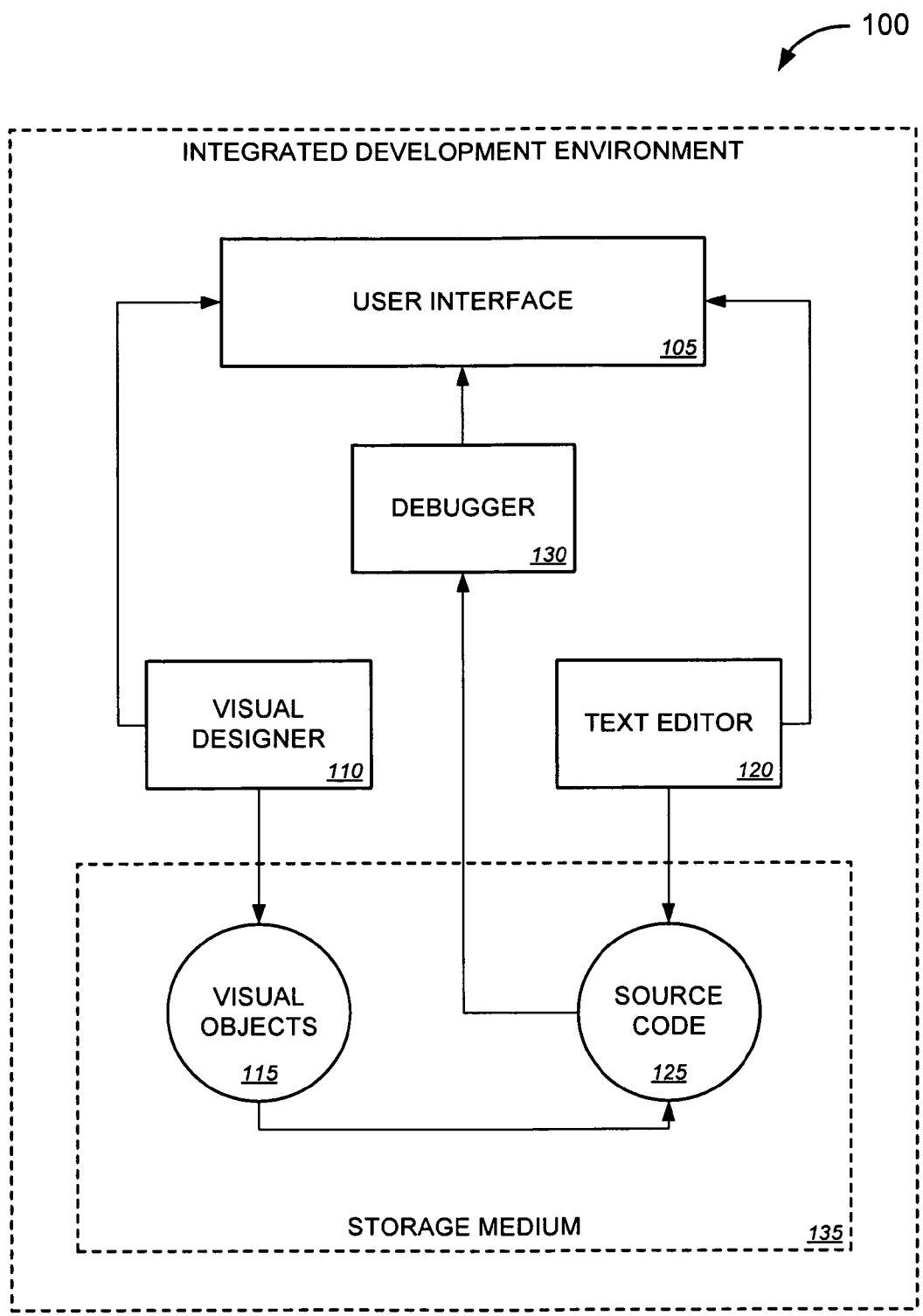
FIG. 1 is a functional block diagram illustrating an integrated development environment.

While various aspects and features of certain embodiments have been summarized above, the following detailed description illustrates a few exemplary embodiments of the invention in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment, as other embodiments may omit such features.

Particular embodiments of the invention provide tools to facilitate the debugging of a software program. (The term "software program" is used broadly herein to describe any set of instructions that can be used to program a computer, a processor, and/or any similar device to operate in a particular way; examples include, but are not limited to, software applications, components, script, etc.). Typical a software program will comprise one or more lines of "computer code," a term that is used broadly herein to refer to any type of instructions and/or code that can be used to program a computer, a processor, and/or any similar device. In some cases, the computer code may be source code (i.e., code that is reasonably readable by a human but which might need to be compiled in order to be executable), object code (i.e., code that has been compiled to be executable on a particular device or class of devices), interpreted scripts (which may be simultaneously human-readable and machine-executable), and/or the like. Except where the context dictates otherwise, specific reference to any of these types of computer code should be considered a general reference to all of the various types of computer code known to those skilled in the art.

Computer code can include, without limitation, code that adheres to an object-oriented programming paradigm, a procedural programming paradigm, and/or the like. In certain embodiments, the computer might be written using a declarative programming paradigm, familiar to those skilled in the art. Examples of declarative code include, without limitation, hypertext markup language ("HTML") documents, other types of web pages, extensible markup language ("XML") documents (including those that implement XSL transformations ("XSLT"), XForms, and/or the like), certain structured query language ("SQL") statements, and/or the like.

Those skilled in the art are familiar with the concept of visual software design, in which the developer arranges procedural steps or software components using a visual designer (typically with graphical components), and establishes relationships between those steps/components using this visual designer. Each of these steps/components then has computer code (which, in a compiled language, is often source code) associated therewith—in some cases, this code is provided (e.g., by a class library, with a development environment, etc.), while in other cases, the provided code might be modified by the developer for a specific purpose, or the developer might write the code for a particular step/component from scratch.

Often, this visual design technique is associated with an object-oriented programming paradigm, such that various graphical elements in the visual designer may be associated with corresponding software objects, although this does not always have to be the case. Hence, the visual design serves as a graphical depiction of the specific steps or components in a more general software program (which typically can be thought of as implementing a process). In other words, this graphical depiction serves as a visual metaphor of a process that is controlled by (i.e., implemented by) various blocks of code that correspond to each of the graphical elements within the depiction.

Certain embodiments extend this visual metaphor to the debugging process. More particularly, in some embodiments, the graphical depiction of the software program/process (i.e., the visual design) can be used to allow the user (often a developer) to track the debugging process at a higher level than many debuggers, which merely step the user though the code, line by line. While this type of debugging can also be supported by various embodiments, certain embodiments beneficially abstract the debugging process to allow the user to track the debugging process through a visual paradigm, which often is easier for the user to interpret than mere lines of code. Hence, as the debugger executes the code of the software program (the debuggee), it shows the user the graphical element corresponding to the currently-executing code.

This functionality, in accordance with various embodiments, can provide several additional benefits as well. Merely by way of example, in some cases, the user can control execution of the debuggee in the debugger using the same visual paradigm. Hence, for example, the user can set breakpoints on a graphical depiction of a software program (e.g., a graphical depiction of the process performed by the software program, a graphical depiction of various components of the program, etc.), and the tools provided by various embodiments can map these breakpoints to the appropriate locations in the computer code corresponding to the visual elements on which the breakpoints are set.

Another benefit provided by certain embodiments is the ability to inspect the state of variables and other execution-specific parameters using this visual paradigm. Hence, if a user sets a breakpoint at a particular graphical element, when the debugger reaches the breakpoint, it will interrupt execution of the debuggee and allow the user to inspect the scope and/or values of any applicable variable at that point in the execution of the debuggee. This functionality, is enabled, in some embodiments, by mapping portions of the graphical depiction to portions of the underlying code, such that a breakpoint set on the graphical depiction likewise can be mapped to a particular portion of the underlying computer code.

The tools provided by various embodiments can be used with a variety of programming languages and/or paradigms, including without limitation as described above. Merely by way of example, in a particular aspect, certain embodiments may be used within a declarative programming paradigm, of which but one example is the development of a series of web pages on a web site (or multiple web sites). Those skilled in the art of web site development will appreciate, based on the disclosure herein, that a web site will often implement a page flow, comprising a plurality of web pages. Each web page may have a lifecycle, which can include various events (such as when a user navigates to a page, triggers events on the page, and/or navigates from the page, etc.), and depending on the events within one web page's lifecycle, a software program (which can be thought of as a collection of pages within the page flow and/or logic for navigating through the web pages, including without limitation associated applets, JavaScript, and/or the like) will navigate to one of one or more subsequent web pages. The visual debugging tools provided by various embodiments can be used to depict this page flow is a process visualized by a page map showing the various pages of the page flow, and during debugging, these tools can show the execution state of the software program (debuggee) using this graphical depiction of the page flow.

From this example, one of skill in the art will appreciate that the visual paradigm provided by certain embodiments can be applied to the development (and/or, more specifically, the debugging) of a variety of software programs. Because most software programs can be thought of as implementing one or more processes, this disclosure describes specific embodiments with respect to the depiction of a process implemented by a software program. It should be recognized, however, that various embodiments can implement this visual debugging paradigm in conjunction with any suitable type of steps, software components, etc. that can be depicted graphically and into which a software program (or the functionality thereof) can be subdivided to allow the visual representation (i.e., graphical depiction) of the software program in this way.

Various embodiments provide tools that may be implemented within any type of debugging framework that includes a graphical interface. Merely by way of example, certain embodiments provide tools that can be implemented as "plug-ins" by third-party development and/or debugging tools. Hence, in an aspect, certain embodiments can be invoked from within a debugger to provide a user with a visual depiction of the debugging process. Other embodiments may provide a debugger with integrated visual debugging capabilities. In particular, one set of embodiments provides tools that can be implemented within an integrated development environment ("IDE"). Typically, an IDE will include a variety of tools for developing software programs, including text editors, reference materials, visual designers, debuggers, and/or the like. Hence, certain embodiments are described below, for purposes of illustration, by reference to an IDE with an integrated debugger; it should be noted, however, that the principles and features illustrated by these exemplary embodiments can, in accordance with other embodiments, be implemented in a variety of different contexts (which may not include an IDE and/or an integrated debugger).

FIG. 1 is a simplified functional diagram illustrating a software system (which might comprise one or more software programs) commonly referred to as an IDE 100. While the IDE 100 is depicted functionally as a set of software components for ease of illustration and description, an IDE system typically is implemented with a suitable hardware architecture, such as a workstation, personal computer, server computer, and/or the like programmed with appropriate software to perform the functions of the IDE. Examples of such hardware architectures are described below with respect to FIGS. 10 and 11.

In some cases, the IDE 100 may be implemented as a unitary software program on a single machine. In other cases, the IDE 100 may be implemented as a plurality of programs, which may all run on a single machine, or which may be distributed in amongst a plurality of machines. Merely by way of example, in some cases, the IDE 100 may be implemented as a client/server program, in which a portion of the IDE 100 is provided on a server machine, and a portion is provided on a client machine, which the user typically will access.

The IDE 100 includes a user interface 105. The user interface 105, as its name implies, provides an interface between the user and the IDE 100. Typically, the user interface 105 is a graphical user interface, and it provides the user with access to some or all of the functions of the IDE 100. Depending on how the IDE 100 is implemented, the user interface may be provided from within the IDE 100 itself (perhaps in conjunction with appropriate calls to an operating system of the machine on which the IDE 100 runs) to display information on a display device connected to the computer on which the IDE 100 is executing, or the user interface 105 may be provided by, or in conjunction with, another program. Merely by way of example, in some cases the IDE 100 may be implemented on a server computer, and the user interface may be implemented on a client computer. Hence, the display of information (such as the graphical depictions, execution status indicators, indications that execution will be interrupted, textual views, etc. described below) via the user interface 105 may be implemented by the server sending data to cause the client computer to display the information in the user interface 105.

To illustrate this feature, consider the case in which a user interacts with the IDE 100 via a web browser—in order to provide the user interface, the server computer may serve web pages (e.g., through a web server, application server, etc.), which can be displayed by the web browser on the client computer. The user then can interact with the IDE 100 through interacting with these web pages in the web browser.

Typically, the user interface 105 (however it is provided) will display information (as described below, for example) via a display device, such as a monitor, a laptop screen, television, and/or the like, and will receive input from the user (as described below, for example) via one or more input devices which can include, without limitation, a keyboard, a mouse, a trackball, a digitizing tablet, and/or the like.

In some cases, the IDE 100 will also include a visual designer component 110, which can be used by the user (e.g., by providing input through the user interface 105) to visually design a software program (e.g., by designing a graphical depiction of a process, such as a page flow, etc.) and/or to display this visual design. The visual designer 110 can be used to create, edit and/or modify one or more visual objects 115 (also described herein as graphical elements), including without limitation icons, flow chart blocks, tables, process diagrams, etc., from which the graphical depiction of the process is comprised. In some cases, the visual designer 110 may include a library of predefined graphical elements, which may correlate to predefined blocks of computer code (which may implement various functions, etc.).

The IDE 100 may also include a text editor 120, which can be used to edit scripts, source code, and/or any other type of text, based on input from the user, which may be received via the user interface 105. In many cases, the text editor 120 will include features to assist the user in developing scripts and/or source code, such as syntactic highlighting, auto-completion, and/or the like. The text editor 120 can be used by the user to create, modify and/or edit source code 125 associated with one or more visual objects 115.

The IDE 100 may also include a debugger 130, which can be used to debug a software program (which may be represented by one or more visual objects 115 and may comprise one or more blocks of source code 125). Typically, when the user invokes the debugger 130, the debugger 130 will access the source code 125 and will begin to execute the program (the debuggee) by executing the source code 125 (perhaps after compiling or precompiling the source code 125). The user interface 105 may display for the user progress of the debugging/execution, for example by highlighting for the user a particular line corresponding to the current execution state of the debuggee. The user interface 105 may also be designed to receive input from the user to control execution of the debuggee, for example by allowing the user to select a particular line of code in which to set a breakpoint, to instruct the debugger to step into a particular block of code (e.g. a particular function), to step over a particular block of code, halt execution of the debuggee, and/or the like.

In some cases, the IDE 100 may store the visual objects 115 and/or the source code 125 on a storage medium 135. The storage medium 135 can be any suitable type of storage medium, including without limitation as described below. Hence, in some cases the debugger 130 may access the source code 125 by loading it from the storage medium 135.

Figure 2:
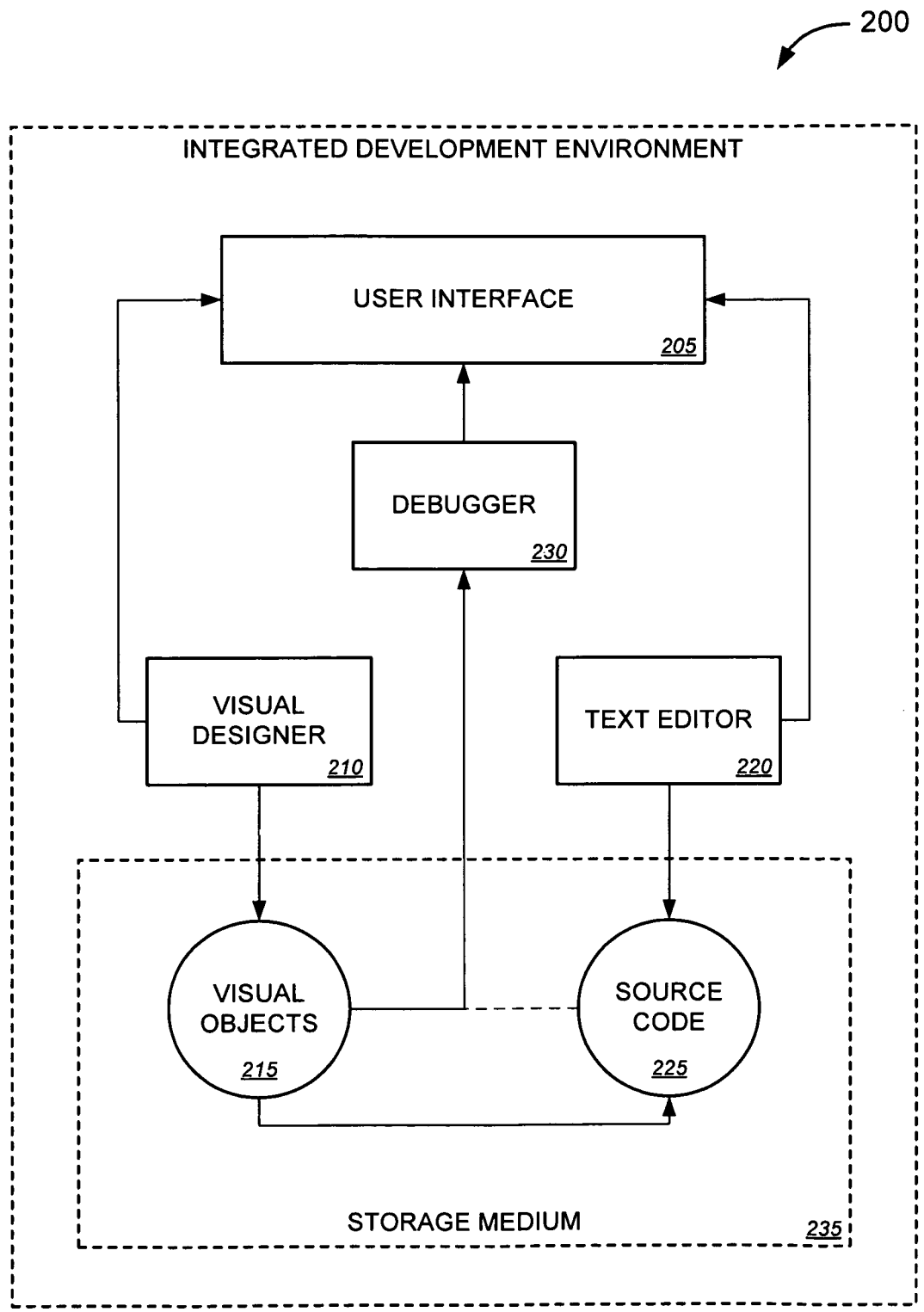
FIG. 2 is a functional block diagram illustrating an integrated development environment, in accordance with various embodiments.

FIG. 2 is a functional diagram of an IDE 200. The IDE 200 is similar, in some respects, to the IDE 100 of FIG. 1, but it operates in a somewhat enhanced manner, in accordance with certain embodiments. Similar to the IDE 100 of FIG. 1, the IDE 200 may include a user interface 205 (which can be used to create/modify/view visual objects 215, generally as described above), a text editor 220 (which can be used to create/modify/view source code 225, generally as described above), and/or a debugger 230. Likewise, the visual objects 215 and/or source code 225 may be stored on a storage medium 235.

When debugging a software program, however, the IDE 200 operates in a somewhat different manner than the IDE 100 described above. A detailed description of the operation of the IDE 200 in accordance with various embodiments is described in further detail below with respect to FIGS. 3 and 4. In general, however, and in accordance with certain embodiments, the IDE 200 accesses not only the source code 225, but also the respective visual objects 215 that correspond to the source code 225. The user interface 205, then, can display the status of debugging (and/or execution of the debuggee), as well as receive user input for controlling the debugging (and/or execution of the debuggee) by reference to not only a textual display of the source code 225, but also by reference to a graphical depiction of the process controlled by the source code 225, which may comprise one or more of the visual objects 215. (In fact, in some cases, the IDE 200 may not even allow the user to interact (e.g. via the user interface 205) with the debugging process except by reference to the graphical depiction of the software program/process).

Figure 3:
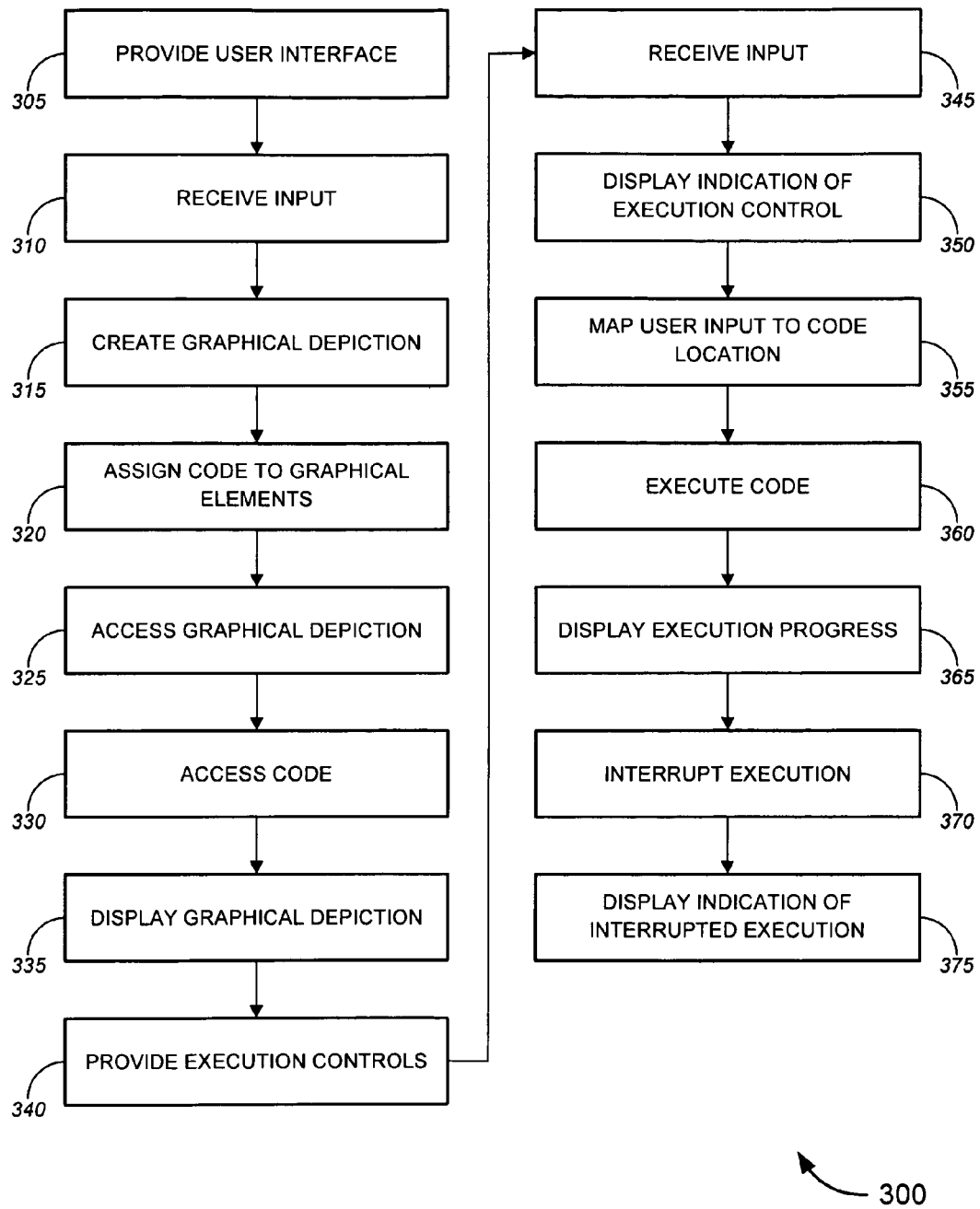
FIGS. 3 and 4 are process flow diagrams illustrating methods of providing interaction between a user and a development environment, in accordance with various embodiments.
Figure 4:
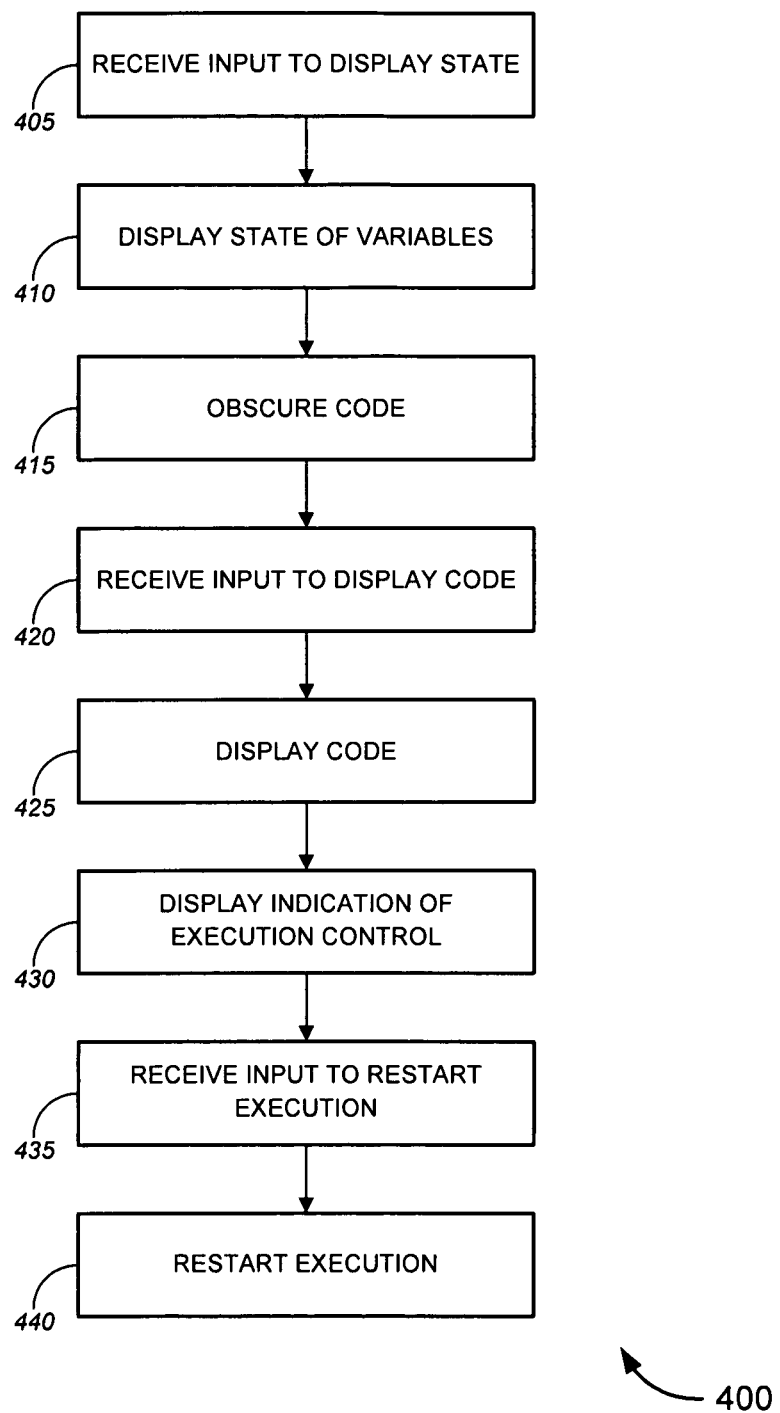

FIGS. 3 and 4 illustrate various methods that can be used to provide interaction between a user (e.g., a developer) on the one hand, and a development environment and/or debuggee on the other hand. While the methods of FIGS. 3 and 4 are illustrated, for ease of description, as different methods, it should be appreciated that the various techniques and procedures of these methods can be combined in any suitable fashion, and that, in some embodiments, the methods depicted by FIGS. 3 and 4 can be considered interoperable and/or as portions of a single method. Moreover, while the methods illustrated by FIGS. 3 and 4 can be implemented by (and, in some cases, are described below with respect to) the IDE 200 of FIG. 2 (or components thereof), these methods can be implemented using any suitable hardware implementation. Similarly, while the IDE 200 of FIG. 2 (and/or components thereof) can operate according to the methods illustrated by FIGS. 3 and 4 (e.g., by executing instructions embodied on a computer readable medium), the IDE 200 can also operate according to other modes of operation and/or perform other suitable procedures.

FIG. 3 illustrates a method for providing interaction between a user and a software debugging environment (which may include, for example, any of a variety of debugging tools, including without limitation a standalone debugging tool, a development environment such as an IDE that includes a debugger, and/or the like). The method 300 comprises providing a user interface (block 305), such as the user interface described above with respect to FIGS. 1 and 2. Providing a user interface can comprise a variety of operations, including without limitation, executing an application (such as an IDE) that provides the user interface, transmitting data (such as web pages, etc.) from a server computer to a client computer and or receiving data at a server computer from a client computer, to allow the client computer to display information for the user and/or receive input from the user, and/or the like. Correspondingly, when this disclosure describes the act of "displaying" information, such descriptions should be understood broadly to include, inter alia, both the direct display of such information by debugger, IDE or other application on a computer system (e.g., on a display device connected with the computer system), as well as the transmission of appropriate data (e.g., web pages) to another computer to cause that other computer to display the information.

Figure 5:
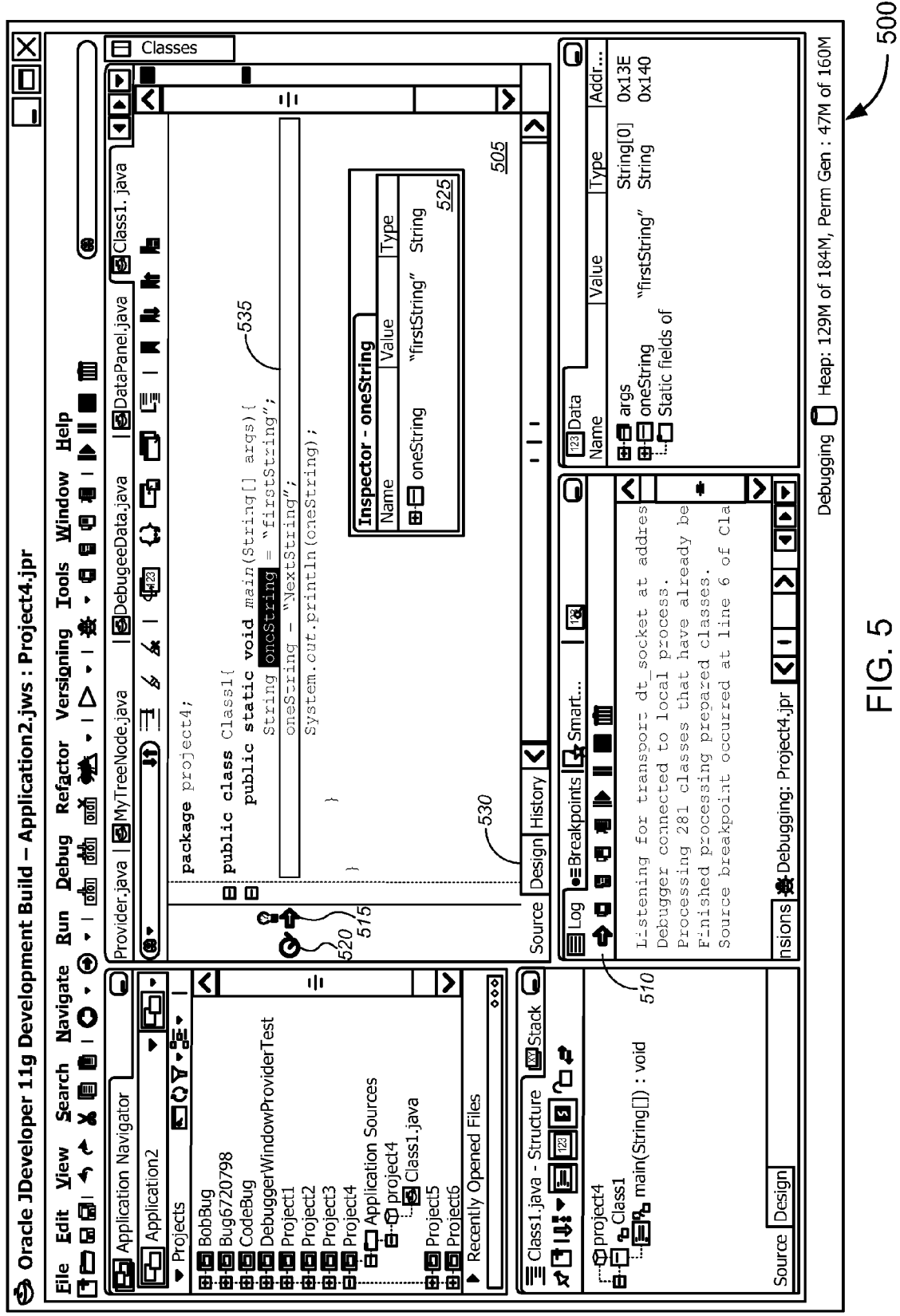
FIG. 5 is an exemplary screen display illustrating a user interface for providing interaction between a user and a development environment, in accordance with various embodiments.

A variety of different user interfaces are possible in accordance with different embodiments. Merely by way of example, FIG. 5 provides an exemplary screen display illustrating a user interface 500 that may be provided by certain embodiments. The user interface 500 includes several display areas (which are referred to herein, for convenience, as panels, but which might also be frames, windows, etc.), including a source code panel 505 for displaying and/or receiving input regarding the source code.

The user interface 500 also includes a set of execution controls 510 for receiving input from a user; such input can be used to instruct the IDE/debugger in order to allow the user to control execution of the debuggee's code. Such execution controls 510 include, without limitation, a "breakpoint" control (which can be used to instruct the debugger to set a breakpoint at a particular location), a "step over" control (which can be used instruct the debugger to step over a code segment, a portion of a process depicted by a graphical element, etc.), a "step into" control (which can be used instruct the debugger to step into a code segment, a portion of a process depicted by a graphical element, etc.), a "continue" control (which restarts execution until another breakpoint is reached or the debugger halts execution for another reason), a "stop" control (which halts execution of the debuggee), and/or the like. The operation of such controls will be familiar to one of skill in the art, except that, in accordance with certain embodiments, these controls can be used not only in conjunction with the computer code itself but also in conjunction with the graphical depiction of the program (and/or the process corresponding to the computer code).

The user interface 500 is also configured to display, for the user, an execution status of the debuggee. Hence, the user interface 500 includes an execution status indicator 515, indicating the location of the code currently executing (or, if the execution has been interrupted, the point at which execution was interrupted). In addition, the user interface 500 includes a graphical indicator of the user's execution control input (in this case, a breakpoint symbol 520, indicating that the user has set a breakpoint at the indicated line of the code).

The user interface 500 also includes an inspector pane 525, which shows the values of one or more variables (or other execution parameters) of the debuggee, as those values have been set at the current execution status. The inspector pane 525 may also show additional data about such parameters, including information like data type, scope, and/or the like. Because the debugger monitors the execution of the debuggee, it has access to all necessary execution parameters and can display those parameters as desired by the user.

Hence, the user interface 500 in this exemplary screen display shows the source code pane 505, and the execution controls 510, graphical indicators 515 and 520, and inspector pane 525 therefore relate to this textual view of the source code. It should be noted, however, that various embodiments provide tools (as described in further detail with respect to FIGS. 6-9, for example) that can also be configured to display, during debugging, a visual representation of the debuggee (such as a graphical depiction of the process controlled by the code being debugged, to name one example). These tools may also provide, in the user interface 500, similar controls and/or indicators to allow the user to view and/or control the debugging process (and/or the execution of the debuggee in the debugger) by reference to the visual (graphical) representation of the debuggee. The user interface 500, therefore, may include a control 530 to allow the user to instruct the IDE to display a visual representation (graphical depiction) of the program or process. (Similarly, when viewing the graphical depiction, an analogous control may be provided to allow the user to view the textual source code view of the program.)

Returning now to FIG. 3, the method may include receiving, at the computer, input for creating a graphical depiction of a process (or other graphical representation of a computer program) (block 310). In some cases, this input may be received via a user interface, such as the interfaces described above. In other cases, the input may be received via other techniques, including via reading a file (which might include graphical depictions and/or textual representations thereof, etc.), by loading a preconfigured visual representation of a software program, and/or the like. As noted above, this visual representation generally will comprise a plurality of graphical elements corresponding to objects within the software program being developed, steps performed in a process embodied by the software program being developed, and/or the like. A variety of visual design tools familiar to those skilled in the art may be provided by the user interface to facilitate the users design of the visual depiction of the software program.

As noted above, in a particular embodiment, the software program might comprise a page flow having one or more web pages. In this exemplary embodiment, the input for creating a graphical depiction of the process might comprise input for creating a page flow map that represents the page flow managed by the software program. Hence, the user might provide input to create graphical depictions (such as icons, etc.) for each of the web pages in the page flow, as well as paths indicating relationships between each of the pages. Similarly, in other contexts, the user may provide input to design visual elements corresponding to various program functions, process steps, and/or the like.

The method may further comprise creating a graphical depiction of the software program and/or the process that the software program implements, controls, etc. (block 315). In some cases, the computer system (e.g., through execution of an IDE) creates this graphical depiction based on input received from the user (as described above, for example) and/or based on supplied templates, templates available from third parties, etc.

Figure 6:
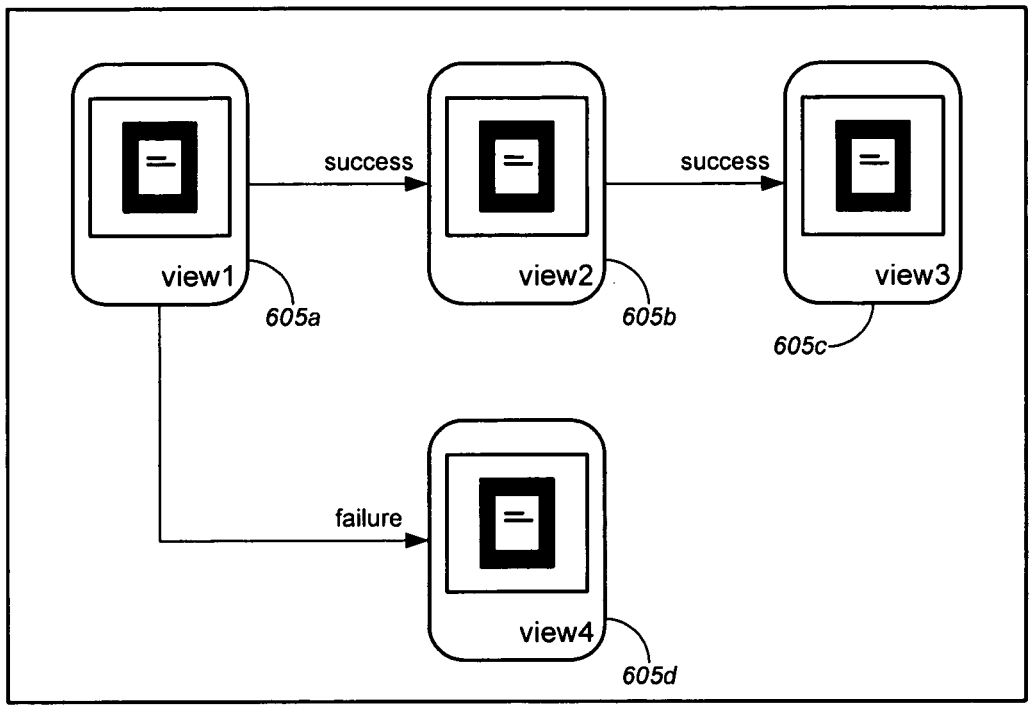
FIGS. 6-9 are exemplary screen displays illustrating a graphical depiction of a process within a user interface, in accordance with various embodiments.

In an aspect of certain embodiments, this graphical depiction can be thought of as a visual illustration (e.g., a map, chart, etc.) of the software program/process. Merely by way of example, FIG. 6 illustrates an exemplary screen display illustrating a graphical depiction 600 of a process (which, in the illustrated embodiment, is a page flow map but might be any other sort of visual depiction of the software program being designed and/or the process implemented/controlled by the computer code of which the software program is comprised). The graphical depiction 600 of FIG. 6 may be displayed, for example, in an appropriate pane of a user interface, such as the user interface 500 described above.

The graphical depiction 600 of FIG. 6 comprises a plurality of graphical elements 605*a-d* (labeled as "view1," "view2," "view3," and "view4," respectively) each representing a view of various web pages in a page flow, along with path symbols (arrows) indicating the relationships between each of the web page views corresponding to the graphical elements 605. This graphical depiction 600 may have been created based on user input, as described above.

Returning again to FIG. 3, the method 300 might further comprise assigning computer code to one or more graphical elements on the graphical depiction (visual representation) of the software program/process (block 320). In some cases, the user may be provided with the ability to write (or otherwise provide) code (e.g., source code, scripts, etc.) to be associated with some or all of the graphical elements. In other cases, each graphical element selected by the user (e.g., in the creation of the graphical depiction) might have pre-assigned code associated therewith—this pre-assigned code might be (but need not be) accessible and/or alterable by the user.

To illustrate, again by reference to FIG. 6, the user may be provided with a facility (such as the source code pane 505 on the user interface 500 of FIG. 5) to create and/or edit code to be associated with each of the graphical elements 605 (and/or the paths—which may be considered graphical elements in their own right—connecting the graphical elements 605) on the graphical depiction 600. It should be noted that the level of granularity of the graphical depiction may vary by implementation and/or embodiment; accordingly, each graphical element may have associated therewith multiple events, functions, etc., each of which may have a set of code associated therewith—in other cases, each of these events, functions, etc. may be represented separately on the graphical depiction.

At block 325, the computer system (and/or more precisely, in some cases, the IDE) accesses the graphical depiction of the program/process, and at block 330, the computer system and/or the IDE accesses a set of computer code associated with the graphical depiction (e.g., the software program's code, which controls the depicted process). In an embodiment, this computer code might include the computer code assigned to each of one or more graphical elements in the graphical depiction of the process.) As noted above, the graphical depiction of the program/process and/or the code itself might be stored on a computer readable medium accessible by the IDE, and accessing the graphical depiction and/or code might comprise loading appropriate data from the computer readable medium. In other cases, the graphical depiction and/or the computer code may already have been loaded, such that accessing this data might merely comprise accessing the data in dynamic memory. If necessary (depending on the nature of the code), accessing the code might also comprise precompiling and/or compiling source code into object code, which can be performed at any appropriate point in the method 300.

The method 300 might further comprise displaying, for the user, the graphical depiction of the program (which may be, in some cases, the graphical depiction of the process controlled by the program's computer code (block 335). In an aspect, the graphical depiction is displayed by the user interface of the IDE (or debugger, etc.). FIGS. 6-9 (described in further detail below) illustrate displays of the graphical depiction throughout the debugging process, and these exemplary screen displays might be displayed (along with execution status indicators, execution controls, etc.) in an appropriate pane of the user interface.

As noted, in some cases, execution controls may be provided (e.g., in the user interface) to allow a user to control execution of the computer code (block 340). In a particular embodiment, these execution controls are provided in connection with a display of the graphical depiction. Merely by way of example, the user interface of FIG. 5 (described above) might be provided, except with a display of the graphical depiction (visual representation) of the program, instead of (or in addition to) a display of the textual view of the code.

At block 345, the computer receives (e.g., via the user interface) input indicating that the user desires to interrupt execution of the computer code at a desired point in the depicted process. In a particular aspect of some embodiments, this input takes the form of an interaction between the user and the displayed graphical depiction. One example of this type of control is commonly referred to as setting a "breakpoint." Those skilled in the art will appreciate that a breakpoint often can be set in source code of a debuggee, in order to halt execution of the debuggee at the point where the breakpoint is set. In accordance with an aspect of some embodiments, however, such breakpoints (and other appropriate types of execution control) can be implemented directly on the graphical depiction of the process, without forcing the user to resort to the source code. Further, in accordance with some embodiments, the user interface will display an indication of this execution control exerted by the user (block 350). Merely by way of example, in some cases, the user interface of the IDE will display an indication on the graphical depiction of the process that execution of the computer code will be interrupted (e.g., halted, at least temporarily) at the desired point in the depicted process.

Figure 7:
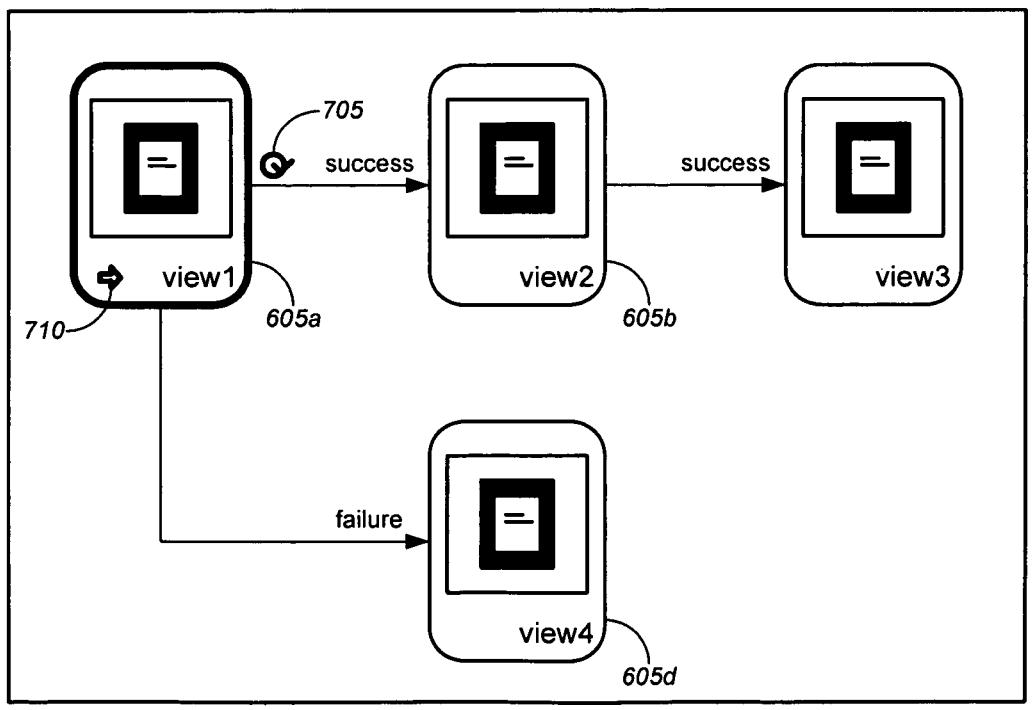

To illustrate these procedures, FIG. 7 shows an exemplary screen display of a graphical depiction 700 of the page flow depicted in FIG. 6, except that the user has provided input (by reference to the graphical depiction) to set a breakpoint on the path between the graphical element 605a for "view1" and the graphical element 605b for "view2." This input might take the form, for example, of the user selecting a "breakpoint" execution control and then selecting (e.g., a clicking with a mouse) a desired location for the breakpoint. Correspondingly, the graphical depiction 700 now shows an execution control indicator (specifically, a breakpoint indicator 705) at the location on the graphical depiction selected by the user.

To determine when execution of the computer code should be interrupted (in response to the user's execution control input), the computer system maps the user input (e.g., the setting of a breakpoint) on the graphical depiction (visual representation) of the process/program to a location in the computer code that corresponds to the user input (e.g., the location in the code that corresponds to the location on the graphical depiction at which the user provided the execution control input) (block 355). In an aspect of some embodiments, because the computer system provides facilities (as described above) to allow the user to design a representation of the software program graphically and to assign code to each of the graphical elements on the visual representation (graphical depiction) of the program (and/or the process it implements, controls, etc.), the computer system can associate each of the graphical elements (and/or components thereof, such as events, functions, etc.) with specific blocks of code in the computer program (which, at this point, is the debuggee). Accordingly, the computer system can then map input (which is provided by reference to the graphical depiction) to a portion of the computer code that corresponds to that graphical element (or component thereof). In some cases, the converse is true as well—the user can provide execution control input by reference to the source code, and the computer system can map this input to a location on the graphical depiction (which then may be displayed to the user, including the execution control indicator).

In particular embodiments, the process of mapping the graphical elements (or execution control instructions, such as breakpoints, etc) to the computer code might also comprise mapping the graphical elements, etc. not only to specific lines of computer code, but also to a particular condition on that computer code. For instance, the same portion of computer code (e.g., a function, object, etc.) might correspond to multiple points within the graphical depiction of the program/process; to distinguish one such point in the graphical depiction from another, the computer might also consider a condition on that computer code (e.g., parameters used in calling the code, variables provided to and/or set by the code, etc.) when mapping a position within the graphical depiction to the computer code.

Merely by way of example, returning to the page flow described above, a single set of code (which might be an object, a function, etc.) might be used to instantiate every web page within the page flow, with the parameters passed to the set of code defining which web page should be instantiated in each instance. Thus, for example, a function in the computer code called createPage (pagename) might be used to generate all of the web pages in a particular flow; in order to map a breakpoint set on "view1" to the computer code, the computer system might search the code for createPage ("view1") to find the proper portion of code that maps to the breakpoint. As another example, a condition might be expressed in terms of an explicit comparison of variables in the context of the physical line of code. For instance, the function viewActivityId.equals ("view2") might be used to evaluate a set of computer code to ensure that it is used within the context of "view2" in order to map that set of computer code to a "view2" graphical element on the graphical depiction.

At block 360, the computer system (or, more precisely in some cases, the IDE and/or debugger) executes the computer code. If necessary, source code may be compiled to produce executable object code prior to execution by the IDE/debugger. One of skill in the art will appreciate that there are a variety of ways in which a debugger and/or IDE can execute the code of a debuggee, and any such techniques may be used in accordance with various embodiments, perhaps with appropriate modifications as described herein to support certain features provided by the various embodiments.

Merely by way of example, a feature of particular embodiments is the ability to display, by reference to the graphical depiction of the process, the progress of the execution of the computer code (block 365). For instance, in some embodiments, the graphical depiction of the process might be modified dynamically to indicate which portion of the depiction corresponds to the line (or lines) of code currently executing. Merely by way of example, FIGS. 7, 8, and 9 collectively illustrate progressive graphical depictions 700, 800, 900, respectively, of the same page flow map, to indicate the progression through the map as different portions of code are executed.

Hence, in the graphical depiction 700 of FIG. 7, the "view1" graphical element is highlighted and an execution status indicator 710 is provided on the "view I" graphical element, to indicate that code associated with this element is currently executing (or that code has executed up to this point). By contrast, in the graphical depiction 800 path between the "view1" graphical element 605*a* and the "view2" graphical element 605*b* has been highlighted, and the execution status indicator 710 has been moved to this path as well, indicating that execution has progressed to code associated with this path. Similarly, on the graphical depiction 900, the execution status indicator 710 has been moved to the "view2" graphical element 605*b*, and that graphical element 605*b* has been highlighted, indicating the further progression of execution of the debuggee to code associated with that graphical element 605*b*. (It should be noted that, while both an execution status indicator 710 and highlighting are provided to indicate execution status on the graphical depictions 700, 800, and 900 of FIGS. 7-9, either of these techniques could be used exclusively, and/or any other suitable technique could be used, to display an indication of the execution status of the debuggee.)

The method 300 might further comprise interrupting execution of the computer code at the desired point the process (block 370). In other words, the computer system (or, more precisely in some cases, the IDE and/or debugger) interrupts execution of the code when the execution state reaches the line of code that the computer system has mapped to the point corresponding to the portion of the graphical depiction that the user has identified (e.g., via user input indicating a breakpoint, etc.) for interrupting execution. A variety of techniques, many of which are common to debugging tools, may be used to interrupt execution of the code.

Figure 8:
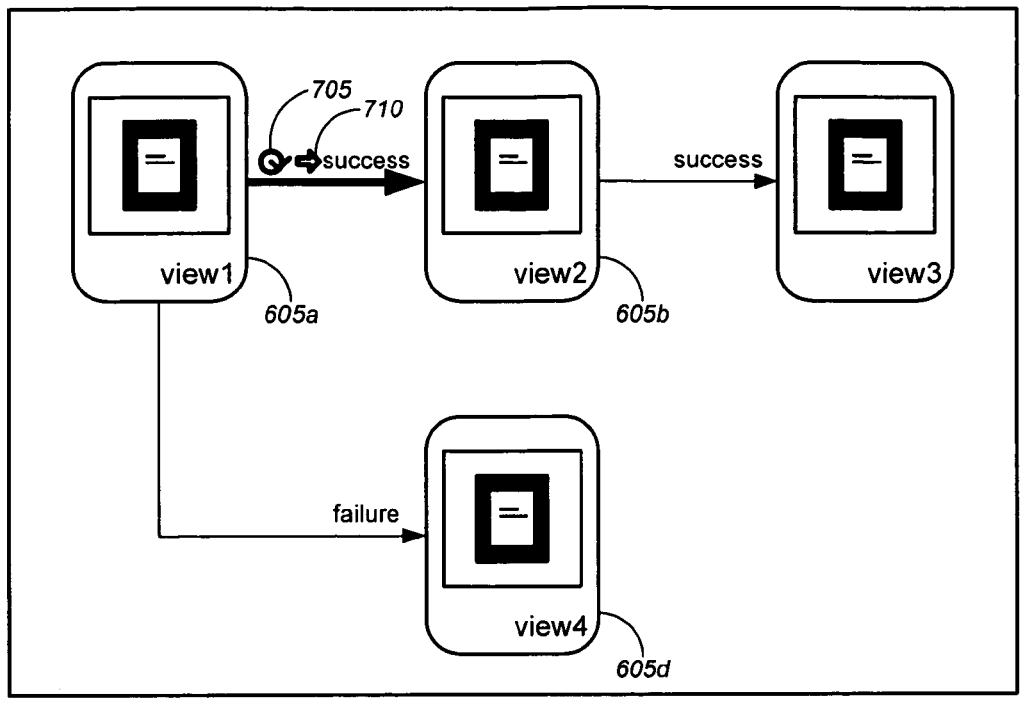
Figure 9:
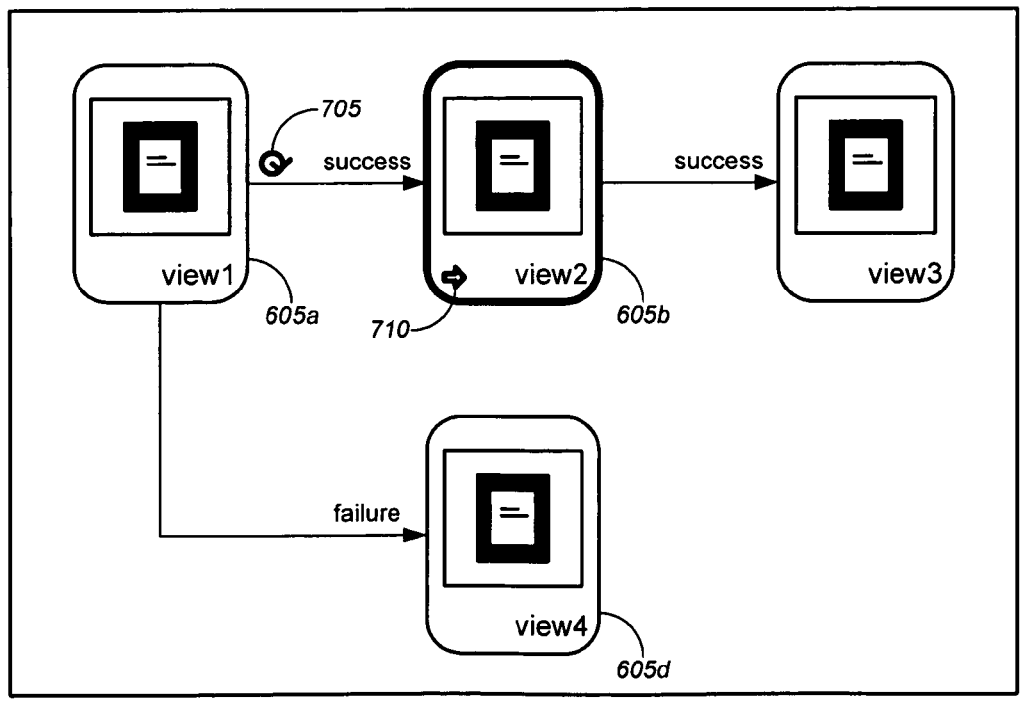

In some cases, the user interface might display, for the user, an indication that execution of the computer code has been interrupted (block 375). In particular embodiments, this indication is provided by reference to the graphical depiction of the process. Merely by way of example, FIG. 8 illustrates a graphical depiction 800 showing an execution state indicator 710 next to the breakpoint indicator 705, showing that the execution state has "caught up" to the breakpoint, that execution therefore has been interrupted, and that the user interface is awaiting further user input. Of course, it should be recognized that many other techniques may be used in addition to (and/or alternatively to) the techniques illustrated by FIG. 8, in accordance with various embodiments.

FIG. 4 illustrates some additional features of certain embodiments. Merely by way of example, as noted above, the user interface might include a facility (such as the inspector pane 525 illustrated on FIG. 5, to name the one example) for displaying the state of one or more variables (or other execution parameters) of the computer code. This facility can allow, for example, a user to inspect the state and/or values of variables at a certain point in the execution (corresponding to a desired point in the process, as depicted graphically in the user interface, for instance). In particular, when execution of the computer code is interrupted (e.g., by reaching a breakpoint set by a user, as indicated above), the user might wish to take that opportunity to inspect the state of one or more variables.

Hence, the method 400 might include receiving (e.g., from the user and/or via the user interface) user input requesting the display of the state of variables (block 405). In response, the computer system might display, via the user interface, a state of one or more variables (block 410). By referring to FIG. 5, one can view an example of an inspector window 525 that is provided by the user interface 500 to display the state of a variable. In the illustrated example, the inspector window is displayed with respect to a view of the computer code, in which a particular line of code 535 is highlighted (and an execution state indicator 515 is provided) to indicate the execution state of the debuggee. In other embodiments, however, this display of variable states may be provided with respect to a visual representation of the debuggee (such as the graphical depiction 800 of FIG. 8, to name but one example). Likewise, in other embodiments, various user interface techniques may be used as an alternative to, and/or in addition to, the inspector window 525 of FIG. 5, for displaying the state of variables and other execution parameters.

In some cases, the IDE might allow a user to develop a software program purely via visual design, such that the computer code underlying each graphical element in a graphical depiction is inaccessible to the user. As noted above, in a novel aspect, certain embodiments allow even applications designed this way to be debugged with a visual debugger. Accordingly, the method 400 might include obscuring the computer code itself (block 415) while still allowing the debugging techniques described herein to be performed. There are a variety of ways in which computer code can be obscured—a few include, merely by way of example, providing only compiled binaries of various code components (each perhaps corresponding to a graphical element available for use in a visual designer), encrypting or otherwise obfuscating source code (which might be provided with an IDE, software design tool, etc.), merely designing the IDE not to display source code, and/or the like. Any such techniques (as well as others) may be implemented, in accordance with various embodiments, to obscure computer code from the user while still allowing for the visual debugging techniques described herein.

In other cases, however, the development environment might be designed to allow the user access to the computer code (e.g., source code) underlying the graphical elements that make up the visual representation (graphical depiction) of the software and/or process it implements, controls, etc. Hence, another novel aspect of certain embodiments allows the user to easily switch between the graphical depiction (as illustrated by FIGS. 6-9, for example) and a textual view of the underlying code (as illustrated by FIG. 5, for example), or even to view both the graphical depiction and the textual code simultaneously.

Accordingly, the method 400 might include receiving user input indicating that the user would like the user interface to display the computer code (block 420). Such input may be received via an appropriate control on the user interface. The method 400, correspondingly, might also include and/or displaying (e.g., in response to the user input) computer code corresponding to at least a portion of the process. (block 425). In an aspect, this functionality can be configured to display, upon request, a portion of the computer code that corresponds to a specified portion of the graphical depiction (e.g., code corresponding to a selected graphical element, a currently-executing portion of the code, a portion of the code containing a breakpoint—at which breakpoint execution might currently be interrupted—and/or the like). Similarly, based on further input, the computer system might switch from the textual view to the graphical view and/or display both views simultaneously.

In some cases, the display of the computer code might further include displaying, in conjunction with (and/or by reference to) the computer code, indications of execution control (block 430). Merely by way of example, the user interface might display, at particular location in the computer code, indication that a breakpoint has been set, and/or an indication that execution of the computer code has been interrupted. Merely by way of example, by reference to FIG. 5, the user interface 500 displays a breakpoint indicator 520, as well as an indication that execution has been interrupted at the breakpoint (e.g., by displaying the execution status indicator 515 next to the breakpoint indicator 520). It should be noted that the breakpoint indicator 520 could reference a breakpoint that was set by the user by reference to the graphical depiction, as described above.

More to the point, in the illustrated examples, the breakpoint indicator and the execution status indicator are similar in both the graphical view depicted by FIG. 8 and the textual view of the code depicted by FIG. 5, although this need not be the case in every embodiment. Similarly, it should be noted that, in certain embodiments, a user can use the user interface to set a breakpoint (or other execution control) in either the textual view of the code or the graphical view of the process, and the user interface will display the breakpoint at the appropriate location in the other view. Further, the same execution controls 510 might control execution in both the textual code view of FIG. 5 and the graphical view of FIGS. 6-9. Hence, in certain embodiments, the user can switch between the graphical view and the textual code view, with the ability to use consistent controls and view consistent information, all during the course of single debugging session.

As noted above, the user interface can include various controls for receiving input to control execution of the debuggee's computer code. Using such controls (or similar user input tools), the computer system might receive input indicating that the user desires to restart execution of the computer code (block 435), and in response, might restart execution of the computer code (block 440). In an aspect, the execution may be restarted from the point at which it was stopped. The technique for restarting the execution often will depend on the nature of the execution control selected. For example, the computer system might restart execution by stepping into a portion of the computer code (which might correspond to a particular graphical element in the graphical depiction of the process), stepping over a portion of the computer code, and/or the like.

Figure 10:
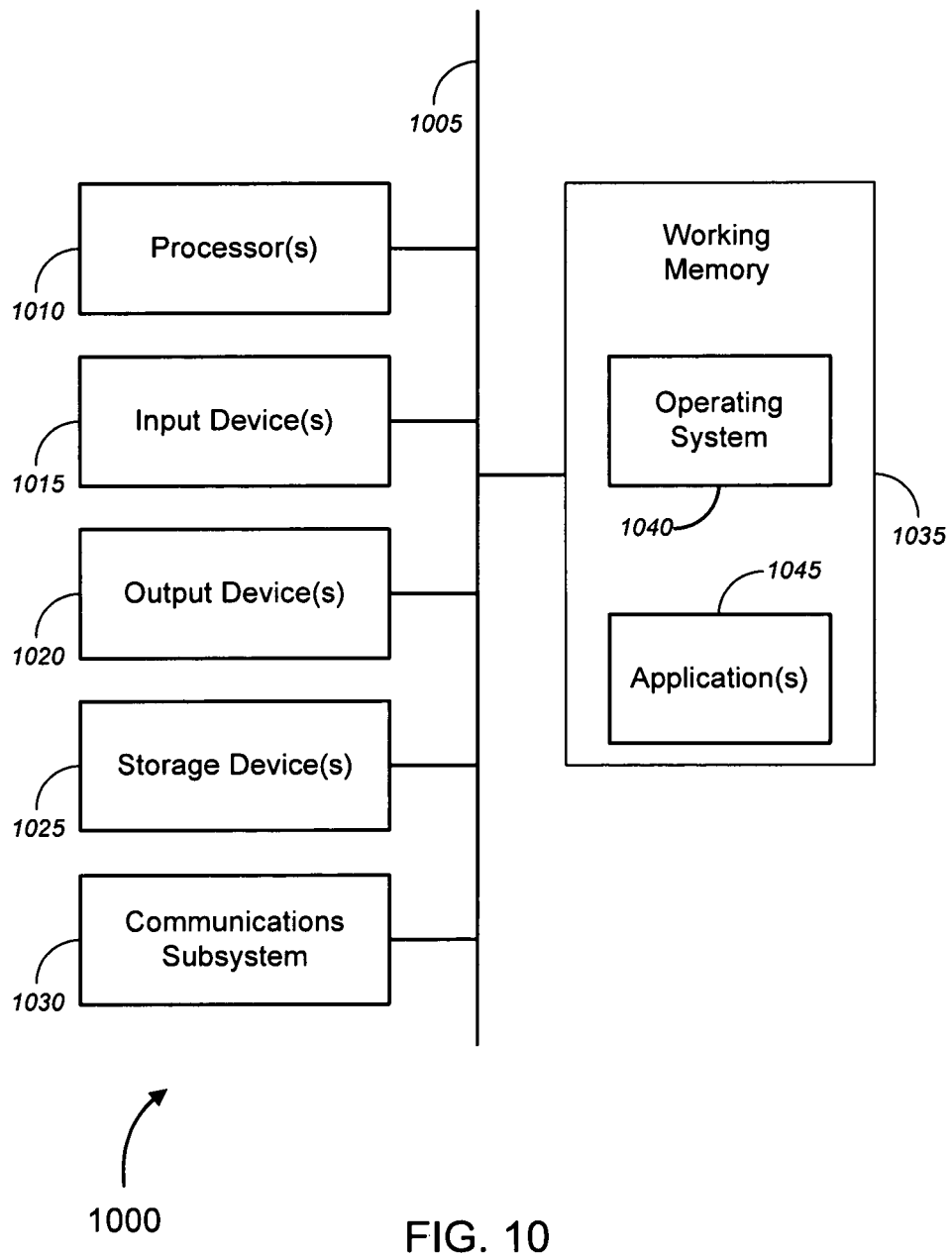
FIG. 10 is a generalized schematic diagram illustrating a computer system, in accordance with various embodiments.

FIG. 10 provides a schematic illustration of one embodiment of a computer system 1000 that can perform the methods provided by various other embodiments, as described herein, and/or can function as a computer system on which a debugger and/or IDE can be implemented. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

Figure 11:
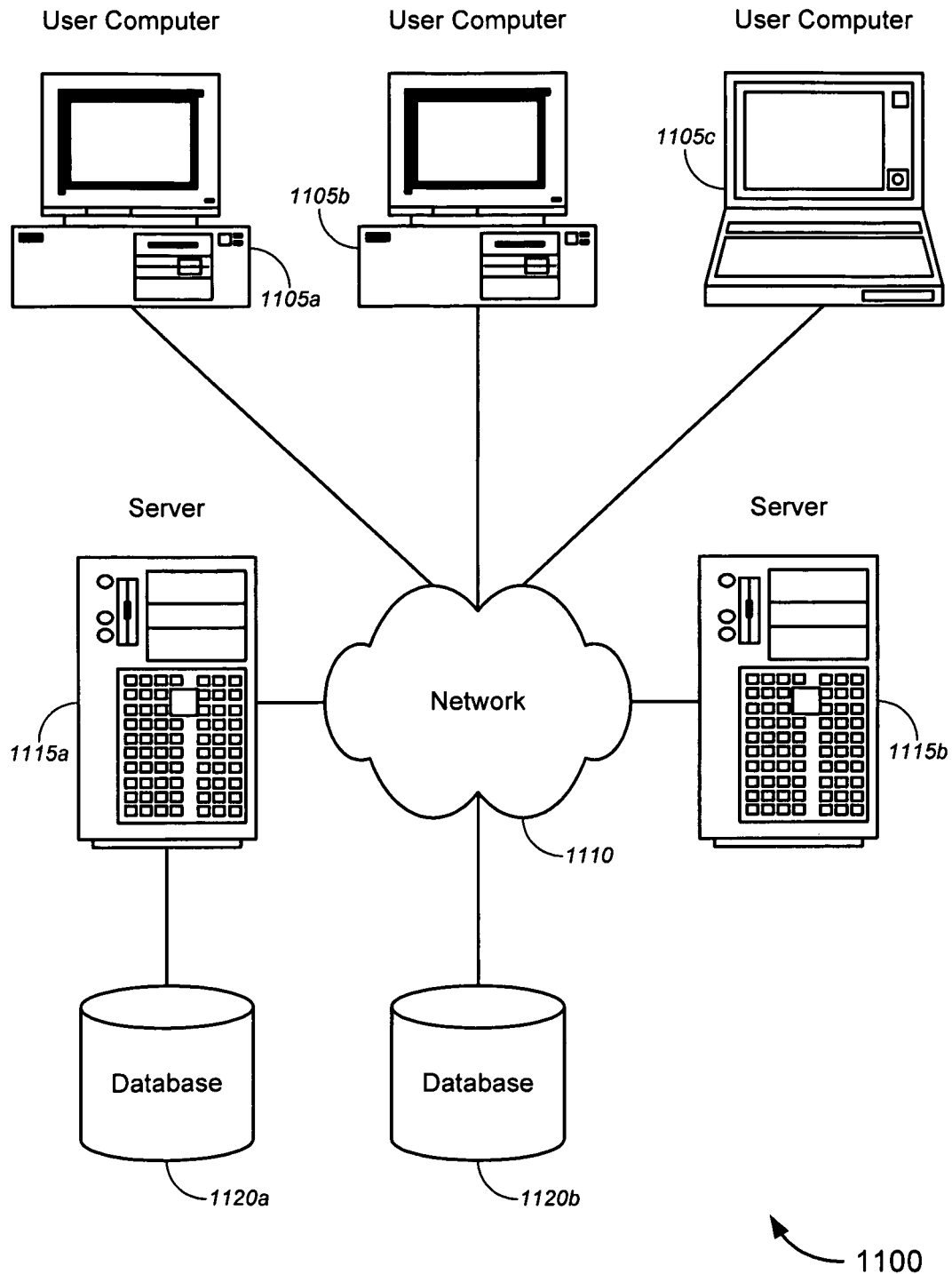
FIG. 11 is a block diagram illustrating a networked system of computers, which can be used in accordance with various embodiments.

A set of embodiments comprises systems for providing interaction between a user and a development environment (and/or a software program being developed and/or debugged in the development environment). Merely by way of example, FIG. 11 illustrates a schematic diagram of a system 1100 that can be used in accordance with one set of embodiments. The system 1100 can include one or more user computers 1105. The user computers 1105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1105 can also have any of a variety of applications, including one or more applications configured to perform methods provided by various embodiments (as described above, for example), as well as one or more office applications, database client and/or server applications, and/or web browser applications. Alternatively, the user computers 1105 can be any other electronic device, such as a thin-client computer, Internet-enabled mobile telephone, and/or personal digital assistant, capable of communicating via a network (e.g., the network 1110 described below) and/or displaying and navigating web pages or other types of electronic documents. Although the exemplary system 1100 is shown with three user computers 1105, any number of user computers can be supported.

Certain embodiments operate in a networked environment, which can include a network 1110. The network 1110 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 1110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can include one or more server computers 1115. Each of the server computers 1115 may be configured with an operating system, including without limitation any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 may be a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments, the web server may be configured to serve web pages that can be operated within a web browser on one or more of the user computers 1105 to perform methods provided by various embodiments.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 1105 and/or another server 1115. In some embodiments, an application server can create web pages dynamically for displaying the information in accordance with various embodiments, such as for displaying a user interface for an IDE and/or debugger. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120. The location of the database(s) 1120 is discretionary: merely by way of example, a database 1120a might reside on a storage medium local to (and/or resident in) a server 1115a (and/or a user computer 1105). Alternatively, a database 1120b can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1135 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing interaction with a software debugging environment, the method comprising:
    receiving, through a user interface of the software debugging environment, a first input, the software debugging environment providing debugging of executable computer code implementing a page flow through a plurality of web pages based on a lifecycle of each of the web pages, the lifecycle of each web page defined by a plurality of events related to the web page, the plurality of events comprising a navigating to the web page, triggering the plurality of events on the web page, and navigating away from the web page and wherein a source code for the executable computer code is obscured from and unavailable to a user of the debugging environment at least in part by rendering the source code inaccessible to the user at least in part by encrypting the source code to create encrypted source code before an execution of the executable computer code;
    assigning a subset of the computer code that controls a process within the page flow to one or more graphical elements of a graphical depiction of the process based on the first input, the graphical depiction comprising a page map showing the plurality of web pages and the page flow;
    providing, via the user interface, the graphical depiction of the process controlled by the executable computer code;
    receiving, via the graphical depiction of the process in the user interface, a second input indicating a breakpoint in the process;
    providing, via the user interface, an indication of the breakpoint on the graphical depiction of the process;
    mapping the breakpoint to a particular location in the executable computer code;
    executing at least some of the executable computer code;
    providing, via the user interface and by reference to the graphical depiction of the process, progress of execution of the executable computer code;
    interrupting execution of the executable computer code at the breakpoint;
    providing, via the user interface, an indication that execution of the executable computer code has been interrupted; and
    providing, via the graphical depiction of the process, a state of execution of the executable computer code at a time of said interrupting execution of the executable computer code.

2. The method of claim 1, wherein mapping the breakpoint to a particular location in the executable computer code further comprises mapping the breakpoint to a particular condition on the executable computer code.

3. The method of claim 1, wherein the process is a page flow comprising a plurality of web pages.

4. The method of claim 1, wherein providing a graphical depiction of the process comprises providing a graphical depiction of a plurality of steps in the process.

5. The method of claim 4, wherein providing progress of execution of the executable computer code comprises providing an indicator of a step in the process corresponding to a currently-executing portion of the executable computer code.

6. The method of claim 4, wherein providing progress of execution of the executable computer code comprises providing, in conjunction with a graphical depiction of a particular step in the process, an output of execution of a portion of the executable computer code corresponding to the particular step in the process.

7. The method of claim 1, wherein interrupting execution of the executable computer code comprises halting execution of the executable computer code.

8. The method of claim 7, further comprising:
    receiving, via the user interface, a third input after interrupting execution of the executable computer code; and
    restarting execution of the executable computer code from the breakpoint based on the third input.

9. The method of claim 1, further comprising:
    restarting execution of the executable computer code from the breakpoint, wherein the restarting execution of the executable computer code comprises stepping into a portion of the executable computer code that corresponds to the source code for the executable computer code that was obscured from and unavailable to the user of the debugging environment.

10. The method of claim 1, further comprising:
    restarting execution of the executable computer code from the breakpoint, wherein the restarting execution of the executable computer code comprises stepping over a portion of the executable computer code that corresponds to the source code for the executable computer code that was obscured from and unavailable to the user of the debugging environment.

11. The method of claim 1, further comprising:
    providing, via the user interface and by reference to the graphical depiction of the process, a state of one or more variables.

12. The method of claim 1, wherein the executable computer code comprises declarative code.

13. A system comprising:
    a processor; and
    a memory coupled with and readable by the processor and storing a set of instructions therein which, when executed by the processor, causes the processor to provide interaction with a software debugging environment by:
        receiving, through a user interface of the software debugging environment, a first input, the software debugging environment providing debugging of executable computer code implementing a page flow through a plurality of web pages based on a lifecycle of each of the web pages, the lifecycle of each web page defined by a plurality of events related to the web page, the plurality of events comprising a navigating to the web page, triggering the plurality of events on the web page, and navigating away from the web page and wherein a source code for the executable computer code is obscured from and unavailable to a user of the debugging environment at least in part by rendering the source code inaccessible to the user at least in part by encrypting the source code to create encrypted source code before an execution of the executable computer code;

assigning a subset of the executable-computer code that controls a process within the page flow to one or more graphical elements of a graphical depiction of the process based on the first input, the graphical depiction comprising a page map showing the plurality of web pages and the page flow;

providing, via the user interface, the graphical depiction of the process controlled by the executable computer code;

receiving, via the graphical depiction of the process in the user interface, a second input indicating breakpoint in the process;

providing, via the user interface, an indication of the breakpoint on the graphical depiction of the process;

mapping the breakpoint to a particular location in the executable computer code;

executing at least some of the executable computer code;

providing, via the user interface and by reference to the graphical depiction of the process, progress of execution of the executable computer code;

interrupting execution of the executable computer code at the breakpoint;

providing, via the user interface, an indication that execution of the executable computer code has been interrupted; and providing, via the graphical depiction of the process, a state of execution of the executable computer code at a time of said interrupting execution of the executable computer code.

14. The system of claim 13, wherein mapping the breakpoint to a particular location in the executable computer code further comprises mapping the breakpoint to a particular condition on the executable computer code.

15. The system of claim 13, wherein the process is a page flow comprising a plurality of web pages.

16. The system of claim 13, wherein providing a graphical depiction of the process comprises providing a graphical depiction of a plurality of steps in the process.

17. The system of claim 16, wherein providing progress of execution of the executable computer code comprises providing an indicator of a step in the process corresponding to a currently-executing portion of the executable computer code.

18. The system of claim 16, wherein providing progress of execution of the executable computer code comprises providing, in conjunction with a graphical depiction of a particular step in the process, an output of execution of a portion of the executable computer code corresponding to the particular step in the process.

19. The system of claim 13, wherein interrupting execution of the executable computer code comprises halting execution of the executable computer code.

20. The system of claim 19, further comprising:
receiving, via the user interface, a third input after interrupting execution of the executable computer code; and
restarting execution of the executable computer code from the breakpoint based on the third input.

21. The system of claim 20, wherein restarting execution of the executable computer code comprises stepping into a portion of the executable computer code.

22. The system of claim 20, wherein restarting execution of the executable computer code comprises stepping over a portion of the executable computer code.

23. The system of claim 13, further comprising:
providing, via the user interface and by reference to the graphical depiction of the process, a state of one or more variables.

24. The system of claim 13, wherein the executable computer code comprises declarative code.

25. A computer-readable memory comprising a set of instructions stored therein which, when executed by a processor, causes the processor to provide interaction with a software debugging environment by:

receiving, through a user interface of the software debugging environment, a first-input, the software debugging environment providing debugging of executable computer code implementing a page flow through a plurality of web pages based on a lifecycle of each of the web pages, the lifecycle of each web page defined by a plurality of events related to the web page, the plurality of events comprising a navigating to the web page, triggering the plurality of events on the web page, and navigating away from the web page and wherein a source code for the executable computer code is obscured from and unavailable to a user of the debugging environment at least in part by rendering the source code inaccessible to the user at least in part by encrypting the source code to create encrypted source code before an execution of the executable computer code;

assigning a subset of the executable computer code that controls a process within the page flow to one or more graphical elements of a graphical depiction of the process based on the first input, the graphical depiction comprising a page map showing the plurality of web pages and the page flow;

providing, via the user interface, the graphical depiction of the process controlled by the executable computer code;

receiving, via the graphical depiction of the process in the user interface, a second input indicating a breakpoint in the process;

providing, via the user interface, an indication of the breakpoint on the graphical depiction of the process;

mapping the breakpoint to a particular location in the executable computer code;

executing at least some of the executable computer code;

providing, via the user interface and by reference to the graphical depiction of the process, progress of execution of the executable computer code;

interrupting execution of the executable computer code at the breakpoint;

providing, via the user interface, an indication that execution of the executable computer code has been interrupted; and providing, via the graphical depiction of the process, a state of execution of the executable computer code at a time of said interrupting execution of the executable computer code.

* * * * *

UNITED STATES PATENT AND TRADEMARK OFFICE
CERTIFICATE OF CORRECTION

PATENT NO. : 9,823,903 B2
APPLICATION NO. : 12/175659
DATED : November 21, 2017
INVENTOR(S) : Bronkhorst et al.

Page 1 of 1

It is certified that error appears in the above-identified patent and that said Letters Patent is hereby corrected as shown below:

In the Specification

In Column 3, Line 3, delete "process;" and insert -- process. --, therefor.

In Column 10, Line 47, delete "and or" and insert -- and/or --, therefor.

In Column 15, Line 42, delete ""view I"" and insert -- "view1" --, therefor.

In Column 19, Line 23, delete "and or" and insert -- and/or --, therefor.

Signed and Sealed this
Thirty-first Day of July, 2018

Andrei Iancu
*Director of the United States Patent and Trademark Office*